(12) United States Patent
Morita et al.

(10) Patent No.: US 10,044,907 B2
(45) Date of Patent: Aug. 7, 2018

(54) INFORMATION PROCESSING APPARATUS AND METHOD FOR THE REPLACEMENT OF PERSONAL INFORMATION IN PRINT DOCUMENTS

(71) Applicants: Nobuhiro Morita, Tokyo (JP); Tomoyuki Nozawa, Fujisawa (JP); Yoshihiro Ogura, Sagamihara (JP); Mitsuru Satoh, Tokyo (JP)

(72) Inventors: Nobuhiro Morita, Tokyo (JP); Tomoyuki Nozawa, Fujisawa (JP); Yoshihiro Ogura, Sagamihara (JP); Mitsuru Satoh, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/172,234

(22) Filed: Jun. 3, 2016

(65) Prior Publication Data
US 2016/0360070 A1    Dec. 8, 2016

(30) Foreign Application Priority Data

Jun. 3, 2015 (JP) .................................. 2015-113191

(51) Int. Cl.
*H04N 1/00* (2006.01)
*H04N 1/44* (2006.01)

(52) U.S. Cl.
CPC .......... *H04N 1/4493* (2013.01); *H04N 1/444* (2013.01); *H04N 2201/0039* (2013.01); *H04N 2201/0094* (2013.01)

(58) Field of Classification Search
CPC .................................................. H04N 1/4493
See application file for complete search history.

(56) References Cited

U.S. PATENT DOCUMENTS

| | | | |
|---|---|---|---|
| 5,404,294 A * | 4/1995 | Karnik | G06F 17/243 707/E17.009 |
| 2006/0164693 A1* | 7/2006 | Matsumoto | H04N 1/32144 358/3.28 |

(Continued)

FOREIGN PATENT DOCUMENTS

| | | |
|---|---|---|
| JP | H06-075958 | 3/1994 |
| JP | H09-237269 | 9/1997 |

(Continued)

*Primary Examiner* — Benjamin O Dulaney
(74) *Attorney, Agent, or Firm* — Oblon, McClelland, Maier & Neustadt, L.L.P.

(57) ABSTRACT

An information processing apparatus in accordance with the present disclosure includes an identification number detecting circuit configured to detect an identification number included in data to be printed, a conversion information obtaining circuit configured to obtain conversion information, associated with the identification number in the data to be printed, from association information associated with an item information displayed to be associated with the identification number in the data to be printed of an item, an information conversion processing circuit configured to convert the identification number, included in the data to be printed, according to the conversion information obtained from the association information by the conversion information obtaining circuit, and a print data generating circuit configured to generate print data for instructing an image forming apparatus to print an output image that includes the converted identification number.

20 Claims, 8 Drawing Sheets

(56) References Cited

U.S. PATENT DOCUMENTS

| | | | | |
|---|---|---|---|---|
| 2006/0223489 | A1* | 10/2006 | Furukawa | H04H 20/59 |
| | | | | 455/403 |
| 2008/0126301 | A1* | 5/2008 | Bank | G06F 11/366 |
| 2011/0243326 | A1* | 10/2011 | Young | H04N 1/442 |
| | | | | 380/246 |
| 2013/0198618 | A1* | 8/2013 | Tanzer | G06F 21/604 |
| | | | | 715/255 |
| 2013/0271777 | A1* | 10/2013 | Ito | G06K 15/18 |
| | | | | 358/1.9 |
| 2013/0272523 | A1* | 10/2013 | McCorkindale | H04N 1/44 |
| | | | | 380/243 |

FOREIGN PATENT DOCUMENTS

| | | |
|---|---|---|
| JP | 2013-114287 | 6/2013 |
| JP | 2014-078060 | 5/2014 |

* cited by examiner

MY NUMBER DETECTION CONDITION INFORMATION

DETECTION TARGET AREA : $(X_1, Y_1) – (X_2, Y_2)$
DETECTION CONDITION : 12 DIGIT NUMBER
...

FIG. 7

| EMPLOYEE NUMBER | NAME | MAIL ADDRESS | IMAGE PATH | AFFILIATION | MY NUMBER |
|---|---|---|---|---|---|
| XXXXX | AAAAA | xxxx@xxxxx.xxx | ¥¥xxxxx¥... | XXXXX | 1234xxxxx |
| XXXXX | BBBBB | xxxx@xxxxx.xxx | ¥¥xxxxx¥... | XXXXX | 1234xxxxx |
| XXXXX | CCCCC | xxxx@xxxxx.xxx | ¥¥xxxxx¥... | XXXXX | 1234xxxxx |
| ... | | | | | ... |

| LIST OF APPLICANT PROCEDURES | | | |
|---|---|---|---|
| NO | NAME | MAIL ADDRESS | MY NUMBER |
| 1 | AAAAA | xxxx@xxxxx.xxx | 1234xxxxx |
| 2 | BBBBB | xxxx@xxxxx.xxx | 1234xxxxx |
| 3 | CCCCC | xxxx@xxxxx.xxx | 1234xxxxx |
| . . . | | | |
| . . . | | | |

FIG. 10

| LIST OF APPLICANT PROCEDURES | | | |
|---|---|---|---|
| NO | NAME | MAIL ADDRESS | MY NUMBER |
| 1 | AAAAA | xxxx@xxxxx.xxx | AAAAA |
| 2 | BBBBB | xxxx@xxxxx.xxx | BBBBB |
| 3 | CCCCC | xxxx@xxxxx.xxx | CCCCC |
| . . . | | | |
| . . . | | | |

FIG. 11

<APPLICANT ENTRY COLUMN>

| NAME | MY NUMBER |
|---|---|
| AAAAA | 1234xxxxx |
| ADDRESS | PHONE NUMBER |
| XXXXXXXXXX XXXXXXXXXX | xxx-xxxx-xxxx |
| NECESSARY DOCUMENT | |
| PLEASE FILL CHECK MARK AND NEEDED NUMBER<br>☐ AAAAA DOCUMENT<br>☐ BBBBB DOCUMENT<br>☐ CCCCC DOCUMENT | |

<ATTENTIONS>
1. ........
2. ........
3. ........

FIG. 12

<APPLICANT ENTRY COLUMN>

| NAME | MY NUMBER |
|---|---|
| AAAAA | AAAAA |
| ADDRESS | PHONE NUMBER |
| XXXXXXXXXX XXXXXXXXXX | xxx-xxxx-xxxx |
| NECESSARY DOCUMENT | |
| PLEASE FILL CHECK MARK AND NEEDED NUMBER<br>☐ AAAAA DOCUMENT<br>☐ BBBBB DOCUMENT<br>☐ CCCCC DOCUMENT | |

<ATTENTIONS>
1. ........
2. ........
3. ........

FIG. 13

```
<EMPLOYEE NAME> XXXXXXX

...

<EMPLOYEE MAIL ADDRESS> XXXXXXXXXXXXXXXX

...

<EMPLOYEE NUMBER> XXXXXXXX
```

FIG. 14

| PRIORITY | TAG INFORMATION | CONVERSION INFORMATION |
|---|---|---|
| 1 | EMPLOYEE NAME | NAME |
| 2 | EMPLOYEE MAIL ADDRESS | MAIL ADDRESS |
| 3 | EMPLOYEE NUMBER | EMPLOYEE NUMBER |
| | . . . | |

FIG. 15

PLEASE SELECT INFORMATION TO BE CONVERTED TO MY NUMBER FROM

| NAME | MAIL ADDRESS | EMPLOYEE NUMBER |
| IMAGE | XXXXX | XXXXX |
| XXXXX | XXXXX | XXXXX |

INFORMATION PROCESSING APPARATUS AND METHOD FOR THE REPLACEMENT OF PERSONAL INFORMATION IN PRINT DOCUMENTS

CROSS-REFERENCE TO RELATED APPLICATIONS

The present application claims priority to Japanese Patent Application No. 2015-113191, filed in Japan on Jun. 3, 2015, the contents of which is hereby incorporated by reference in its entirety.

BACKGROUND

Technical Field

The present invention relates to an information processing apparatus, method and computer readable medium storing executable instructions that cause a computer to execute a process to replace or obscure personal identification information in print documents.

Description of the Related Art

Personal identification information such as a social security number, used in the United States, or the newly issued "My Number" in Japan, is frequently used for identification verification, payment of taxes, and other administrative or governmental purposes. With the increased threat of identity theft, however, such information must be kept safe. To prevent the theft or misuse of such personal identification information, it is necessary to employ security methods to hide or obscure such information.

SUMMARY

An information processing apparatus in accordance with the present disclosure comprises an identification number detecting circuit configured to detect an identification number included in data to be printed, a conversion information obtaining circuit configured to obtain conversion information, associated with the identification number in the data to be printed, from association information associated with an item information displayed to be associated with the identification number in the data to be printed of an item, and an information conversion processing circuit configured to convert the identification number, included in the data to be printed, according to the conversion information obtained from the association information by the conversion information obtaining circuit.

The information processing apparatus further includes a print data generating circuit configured to generate print data for instructing an image forming apparatus to print an output image, based on the processed data to be printed, that includes the converted identification number. The information processing apparatus may be connected to the image forming apparatus via a network.

An information processing method in accordance with the present disclosure includes detecting, by circuitry of an information processing apparatus, an identification number included in data to be printed, obtaining conversion information, associated with the identification number in the data to be printed, from an association information associated with an item information displayed to be associated with the identification number in the data to be printed, and converting the identification number, included in the data to be printed, according to the conversion information obtained from the association information.

The information processing method further includes generating print data for instructing an image forming apparatus, to print an output image, based on the processed data to be printed, that includes the converted identification number. The information processing apparatus may be connected to the image forming apparatus via a network.

BRIEF DESCRIPTION OF THE DRAWINGS

The accompanying drawings are included to provide further understanding of the application, and are incorporated in and constitute a part of this specification.

DETAILED DESCRIPTION OF THE PREFERRED EMBODIMENTS

Embodiments of the present disclosure are described below with reference to the accompanying drawings.

A system in accordance with the present disclosure includes an information processing apparatus, such as a Personal Computer (PC), and an image forming apparatus, such as a printer, multi-function peripheral (MFP) or other printing device.

In an exemplary implementation of the system, an operation is executed by the system when the image forming apparatus prints an image including personal identification information, such as My Number. Although the present disclosure will reference My Number from this point on, exemplary implementations of the system, information processing apparatus and method may be utilized to replace or obscure other types of personal identification information (social security number, driver's license number, tax identification number, etc.) in print documents.

In particular, when the image forming apparatus prints an image that includes My Number, the My Number is converted to and/or replaced with other user information so that a user is able to look up their My Number according to the user information while the My Number is protected from potential unauthorized viewers of the printed image.

Figure 1:
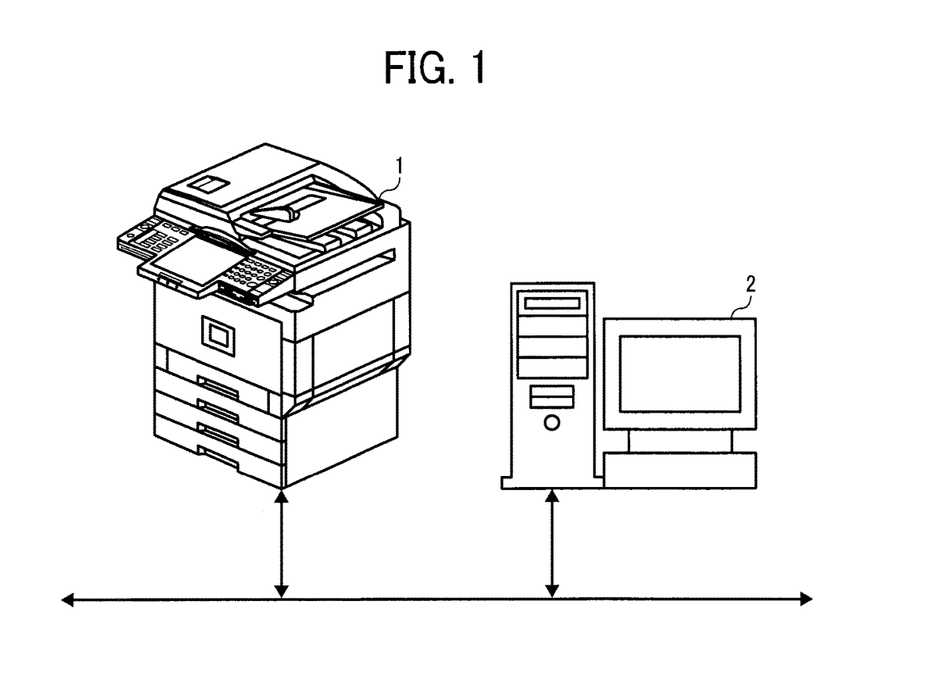
FIG. 1 illustrates an exemplary system in accordance with the present disclosure.

FIG. 1 illustrates an exemplary system in accordance with the present disclosure. In particular, the system may include a MFP 1 and client terminal 2, which are connected to each other via a network, such as a local area network (LAN). The network may be wired or wireless, and the network may be limited to a specific area or may be a wide area network, and/or the internet. Further, each of MFP 1 and client terminal 2 may be connected via an Universal Serial Bus (USB) interface.

In an exemplary implementation, MFP 1 may comprise an information processing apparatus within an office. In the exemplary system, MFP 1 may be a general device which executes an image forming output according to a print job that is transmitted from the client terminal 2. MFP 1 may also comprise hardware to perform functions such as scanning, faxing, email, document editing and printing. The client terminal 2 may be an information processing terminal, such as a PC, a smart phone, a tablet or other type of user terminal. The client terminal 2 may be installed with a printer driver which generates print data that is used to instruct MFP 1 to execute an image forming output.

Furthermore, MFP 1 may have a hardware configuration similar to that of client terminal 2. Such an exemplary hardware configuration of MFP 1 and client terminal 2 will now be discussed with reference to FIG. 2. In particular, one or both of MFP 1 and client device 2 may operate as an information processing apparatus.

Figure 2:
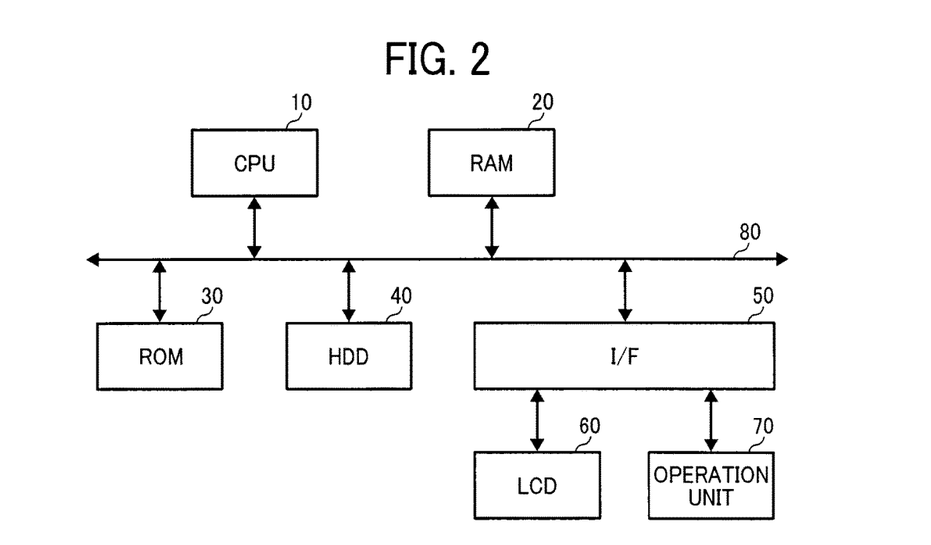
FIG. 2 illustrates a hardware configuration of an information processing apparatus in accordance with the present disclosure.

FIG. 2 illustrates a hardware configuration of an information processing apparatus in accordance with the present disclosure. As illustrated in FIG. 2, an information processing apparatus according to the present disclosure includes circuitry. In some embodiments, the circuitry of the information processing apparatus includes Central Processing Unit (CPU) 10, Random Access Memory (RAM) 20, Read Only Memory (ROM) 30, Hard Disk Drive (HDD) 40, and interface (I/F) 50, which may be connected to each other via a bus 80. The information processing apparatus may further include Liquid Crystal Display (LCD) 60, which is connected to operation unit 70 via I/F 50. The circuitry may be processing circuitry. Further, the circuitry may include one or more circuits that correspond, or each correspond, to specific functions and/or data calculations performed by the information processing apparatus.

In some embodiments, CPU 10 controls the operation of the entire information processing apparatus. RAM 20 is a volatile storage medium in which information may be read from and written to at a high speed. For example, RAM 20 may be used as a temporary work area when CPU 10 processes information. ROM 30 is a read-only non-volatile storage medium that stores execution instructions, such as, for example, firmware. HDD 40 is a non-volatile storage medium in which information may be read from and written to. HDD 40 stores, for example, an Operating System (OS), various control programs and application programs.

I/F 50 may connect bus 80, internal hardware and external devices via the network. LCD 60 may display a visual user interface for a user to interact with, such as to confirm a condition, instruction or setting of the information processing apparatus. Operation unit 70 may include, for example, a keyboard and mouse, for a user to input information into the information processing apparatus. In other embodiments, however, operation unit 70 may comprise other input means for the user to input information, instructions or settings, such as via touch or spoken input.

The circuitry, such as the CPU 10, may control an operation of the information processing apparatus in accordance with executable instructions, such as a program, stored in the ROM 30 or loaded to the RAM 20. The executable instructions may be loaded to RAM 20 from ROM 30, HDD 40 or from an external storage medium such as a thumb drive or an Optical disk. Thereby, CPU 10 may control an execution of the below-described functions (function units) of MFP 1 and the client terminal 2.

Figure 3:
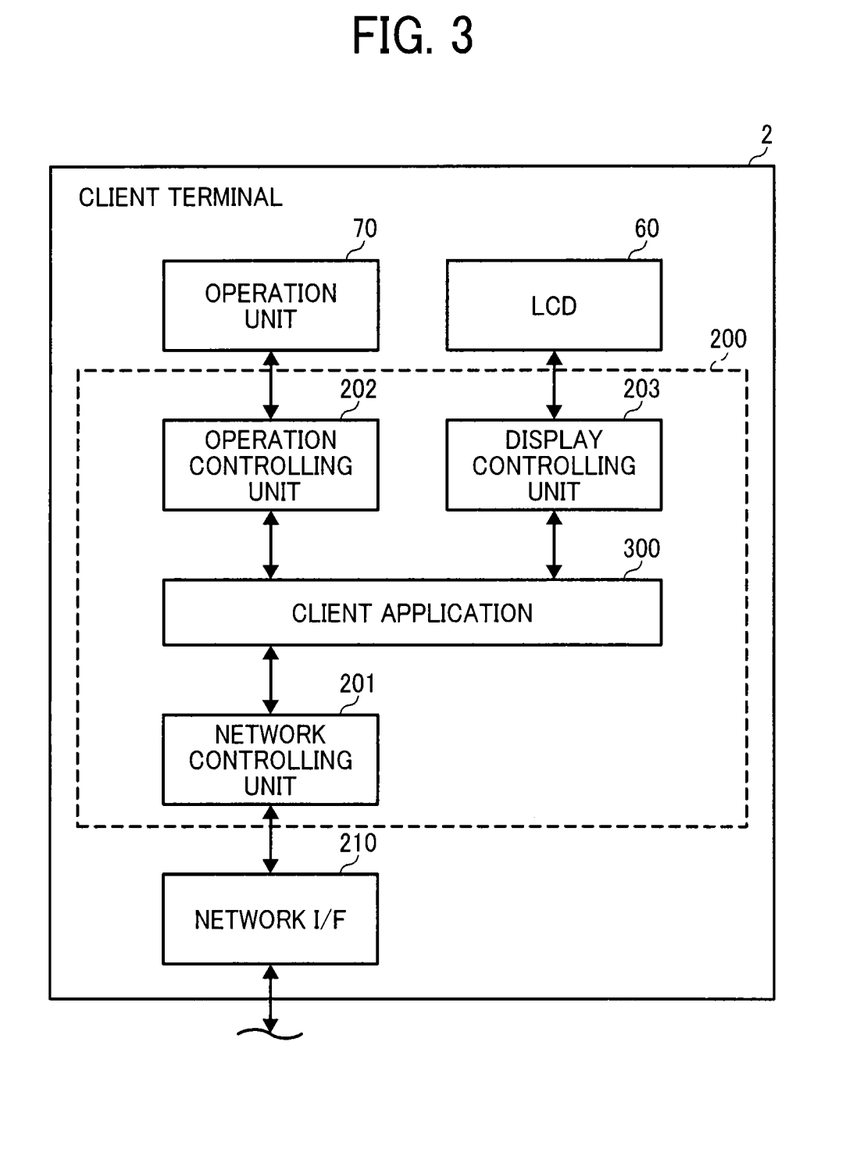
FIG. 3 illustrates a client terminal in accordance with the present disclosure.

Next, client device 2 is described. FIG. 3 illustrates client terminal 2 in accordance with the present disclosure. As illustrated in FIG. 3, the client terminal 2 includes LCD 60 and the operation unit 70, as illustrated in FIG. 2. Client device 2 further includes a controller 200 and a network I/F 210.

In exemplary implementations, the circuitry of the information processing apparatus corresponds to controller 200 of FIG. 2. That is, the circuitry that encompasses CPU 10 executes the functions and processes of controller 200 so as to control client terminal 2. In other embodiments, however, an external device separate from client terminal 2 may perform the functions and processes of controller 200, for example, by performing the functions and processes of controller 200 and controlling client terminal 2 via the network.

Controller 200 includes a network controlling unit 201, an operation controlling unit 202, a display controlling unit 203, and a client application unit 300.

The network I/F 210 includes an interface for enabling the client terminal 2 to communicate with other devices via the network. The network I/F 210 may be, for example, an Ethernet (registered trademark) interface, Bluetooth (registered trademark) interface, Wireless Fidelity (WIFI) interface, or USB interface.

In exemplary implementations, controller 200 controls the client terminal 2 as a control unit. The network controlling unit 201 obtains the input information via the network I/F 210. The network controlling unit 201 transmits the input information to other devices via the network I/F 210.

The operation controlling unit 202 obtains signals of operation contents which the user inputs to the operation unit 70. The operation controlling unit 202 inputs the operation contents to a module (for example, the client application 300) executed in the client terminal 2, for example. Client application 300 may be executed via the circuitry, controller 200, CPU 10 or a combination of components of client terminal 2.

The display controlling unit 203 executes, for example, a Graphical User Interface (GUI) of the client application 300, displays various information, for example the condition of the client terminal 2, on LCD 60.

Client application 300 is a software module for implementing functionalities of the client terminal 2. The client application 300 may be constituted by software programs corresponding to the respective functions. The client application 300 according to the present embodiment is described with reference to FIG. 4.

Figure 4:
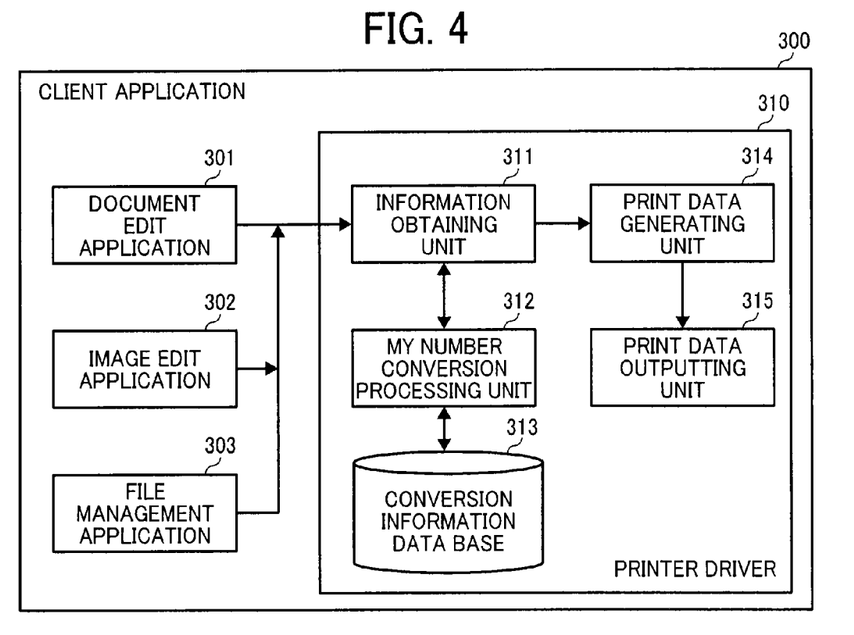
FIG. 4 illustrates an exemplary client application.

FIG. 4 illustrates an exemplary client application 300. As illustrated in FIG. 4, the client application 300 includes a document edit application 301, an image edit application 302, a file management application 303, and a printer driver 310. The document edit application 301 is an application which provides a function of document edit. The image edit application 302 is an application which provides a function of image edit. The file management application 303 is an application which provides a function of file management. The document edit application 301, the image edit application 302, and the file management application 303 input data to be printed out to the printer driver 310 in response to the user operation.

When the client terminal 2 transmits a print job to MFP 1, the printer driver 310 generates print data. Furthermore, the printer driver 310 has functions of detecting My Number included in the data to be printed out, extracting My Number from the data to be printed out, and converting the extracted My Number into other data prior to the generation of the print data.

As illustrated in FIG. 4, the printer driver 310 includes an information obtaining unit 311, a My Number conversion processing unit 312, a conversion information database 313, a print data generating unit 314, and a print data outputting unit 315. The information obtaining unit 311 obtains, for example, document data and image data to be printed from the document edit application 301, the image edit application 302 and the file management application 303. The information obtaining 311 obtains operation data from the operation controlling unit 202 in response to an operation input to the operation unit 70.

The My Number converting unit 312 analyzes the data to be printed, obtained via information obtaining 311. The My Number converting unit 312 converts the My Number, included in the data to be printed, to other data. For example, My Number converting unit 312 converts the My Number, included in the data to be printed, into a real name and/or telephone number of a person corresponding to the My Number.

The conversion information database 313 is a database with which the conversion information to be referred when My Number is converted to other data is registered.

The print data generating unit 314 generates the print data based on the data. The print data includes print information to instruct MFP 1, which is the image forming apparatus, to execute an image forming output. The print data generating unit 314 provides a function of a print data generating unit. The print data outputting unit 315 instructs the network controlling unit 201 to transmit the print data generated by the print data generating unit 314 to MFP 1.

Next, the functions of the My Number conversion processing unit 312 according to the present disclosure are described with reference to FIG. 5.

Figure 5:
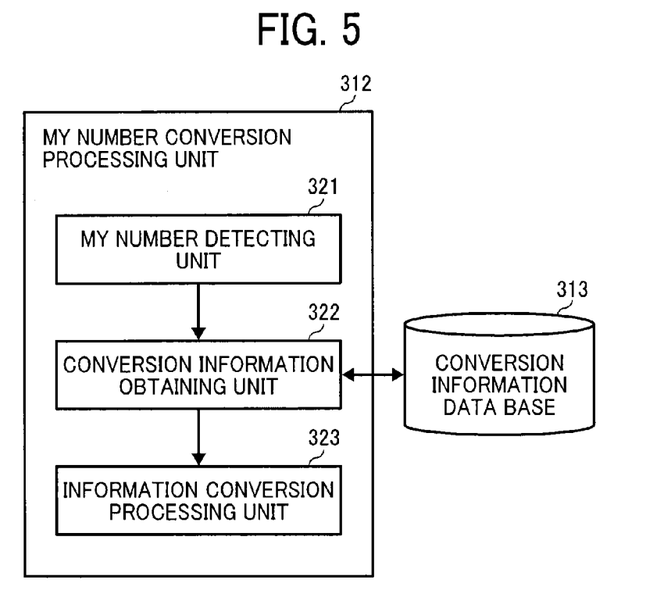
FIG. 5 illustrates an exemplary My Number conversion processing unit.

FIG. 5 illustrates an exemplary My Number conversion processing unit 312. As illustrated in FIG. 5, My Number conversion processing unit 312 includes a My number detecting unit 321, a conversion information obtaining unit 322, and an information conversion processing unit 323.

Figure 6:
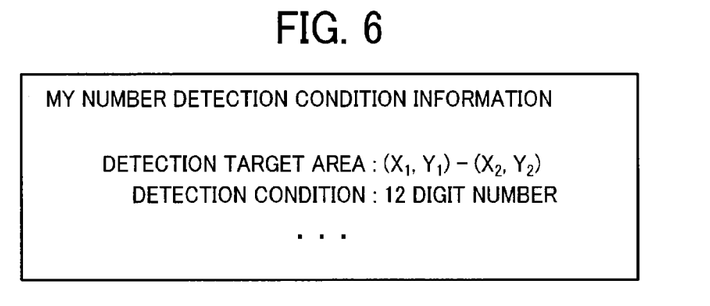
FIG. 6 illustrates exemplary My Number detection condition information.

The My Number detecting unit 321 obtains the data to be printed from the information obtaining unit 311. The My Number detecting unit 321 detects a My Number included in the data to be printed. In particular, the My Number detecting unit 321 detects a My Number based on My Number detection condition information, which is illustrated in FIG. 6. As illustrated in FIG. 6 My Number detection condition information according to the present embodiment includes information of "detection target area" and "detection condition".

"Detection target area" is information that specifies a target position used to confirm an existence of My Number in the data to be printed. "Detection condition" is information of condition to confirm the existence of the My Number. If there is information that matches the "detection condition" in a position specified by "detection target area", the My Number detecting unit 321 determines that a My Number is present in the data to be printed. However, if information does not match the "detection condition" at the position specified by the "detection target area," the My Number detecting unit 321 determines that a My Number is not present in the data to be printed.

For example, as illustrated in FIG. 6, if a 12 digit number is displayed at an area of (X1,Y1)-(X2,Y2) in the data to be printed, the My Number detecting unit 321 determines that a My Number is included in the data to be printed. The My Number detecting unit 321 then extracts the 12 digit number.

The conversion information obtaining unit 322 obtains the conversion information from the conversion information database 313 based on the 12 digit number extracted by the My Number detecting unit 321. The content of the conversion information database according to the present embodiment is described with reference to FIG. 7.

Figure 7:
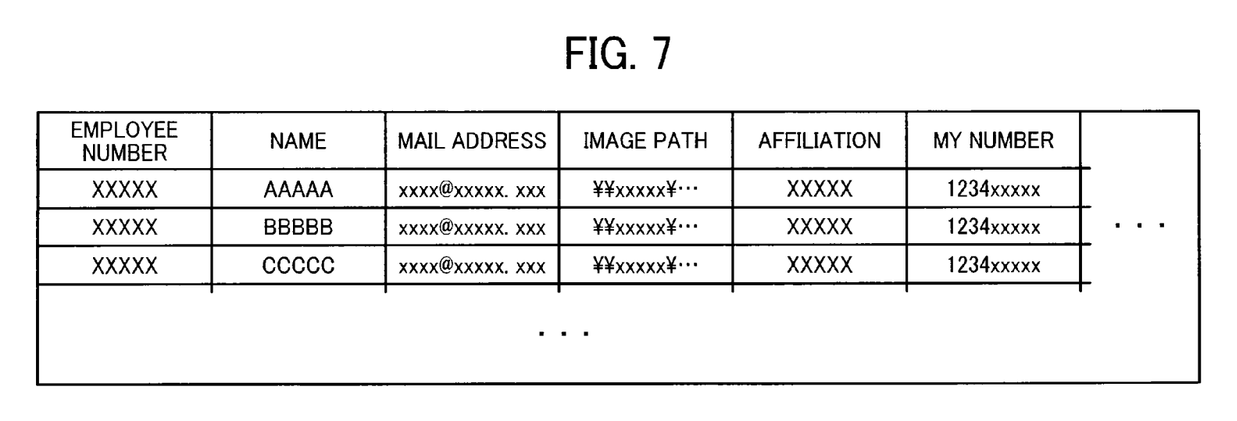
FIG. 7 illustrates exemplary content of a conversion information database.

FIG. 7 illustrates exemplary content of a conversion information database 313. As illustrated in FIG. 7, information stored in the conversion information database 313 according to the present embodiment includes information associated with an individual's My Number. For example, the information may include "employee number", "name", "mail address", "image path", "affiliation", and the "My Number".

Information of "employee number", "name", "mail address", "image path", "affiliation", and "My Number" shown in FIG. 7 may be used as the conversion information. Such information may be included in the data to be printed. The information may be considered as candidate information and displayed with their association with the My Number in the data to be printed.

The conversion information obtaining unit 322 extracts information, as the conversion information, associated with My Number. That is, the conversion information obtaining unit 322 determines the conversion information based on tag information included in the data to be printed from "employee number", "name", "mail address", "image path", and "affiliation". Tag information will be discussed later.

The information conversion processing unit 323 generates the data to be printed by converting the My Number based on the conversion information obtained by the conversion information obtaining unit 322. As a result, the data to be printed will include other data, according to the conversion information, in place of the My Number. Next, printer driver 310 generates the print data and transmits the print data, which is described with reference to FIG. 8.

Figure 8:
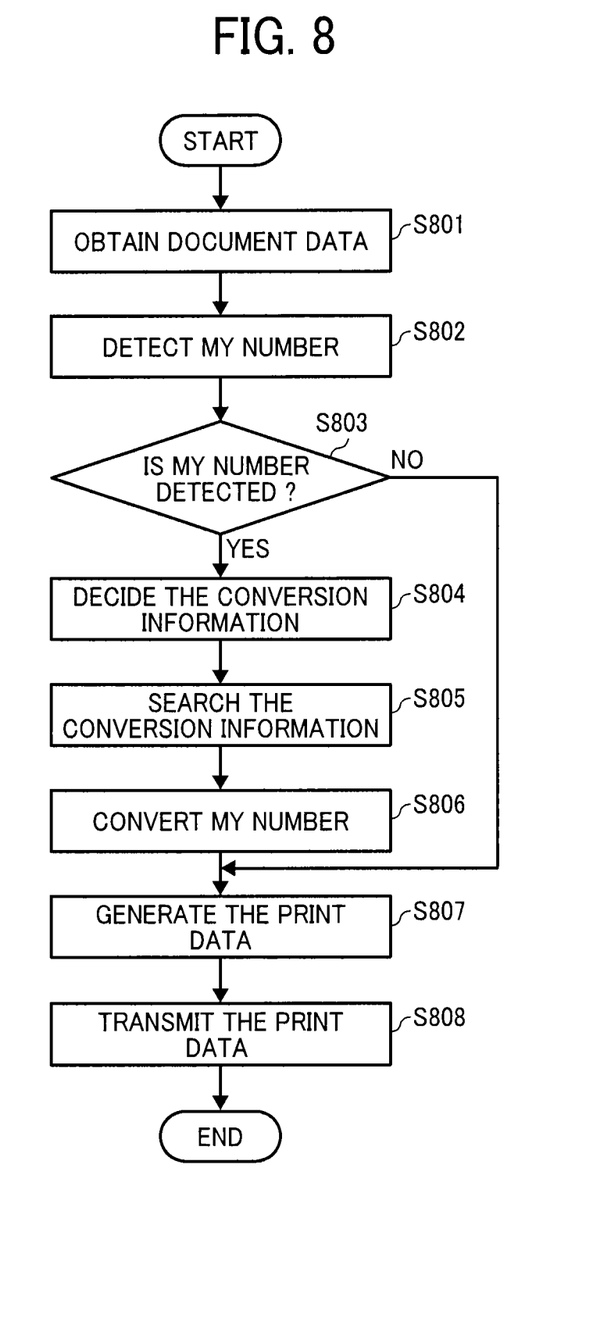
FIG. 8 illustrates a flowchart of an exemplary process to transmit a printing data of an image data including My Number.

FIG. 8 illustrates a flowchart of an exemplary process to transmit a printing data of an image data including My Number. The process illustrated in FIG. 8 is performed by the circuitry of the information processing apparatus. For example, the process may be performed CPU 10 and/or controller 200, which executes client application 300.

As illustrated in FIG. 8, the process begins when the information obtaining unit 311 obtains a document data to be printed (S801). Then, the My Number detecting unit 321, of the My Number conversion processing unit 312, executes processing to detect a My Number (S802).

In the processing of S802, if My Number is not detected in the data to be printed (S803/NO), then the My Number conversion processing unit 312 notifies the information obtaining unit 311 that a My Number was not detected and the process proceeds to S807, where The print data generating unit 314 generates the print data (S807) and transmits the print data (S808).

Alternatively, if a My Number is detected in the data to be printed (S803/YES), then the My Number detecting unit 321 extracts the My Number.

After extraction of the My Number, the conversion information obtaining unit 322 decides the conversion information from "employee number", "name", "mail address", "image path", and "affiliation" shown in FIG. 7 (S804).

The conversion information obtaining unit 322 according to the present embodiment decides the conversion information based on tag information included in the data to be printed from "employee number", "name", "mail address", "image path", and "affiliation". Further details of processing of S804 will be described later.

After the conversion information obtaining unit 322 decides the conversion information, the conversion information obtaining unit 322 searches the conversion information stored in the conversion information database 313 based on the extracted My Number. The conversion information obtaining unit 322 obtain the conversion information searched from the conversion information database 313 (S805). When the conversion information obtaining unit 322 obtains the conversion information, the information conversion processing unit 323 converts the My Number based on the conversion information (S806). The information conversion processing unit 323 then generates the print data based on the conversion information (S807) and transmits the print data (S808).

Figure 9:
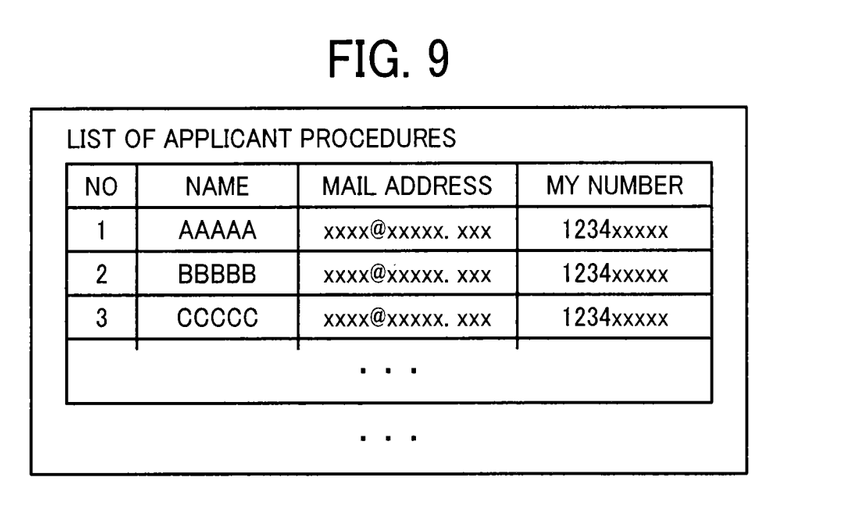
FIG. 9 illustrates exemplary data to be printed.
Figure 10:
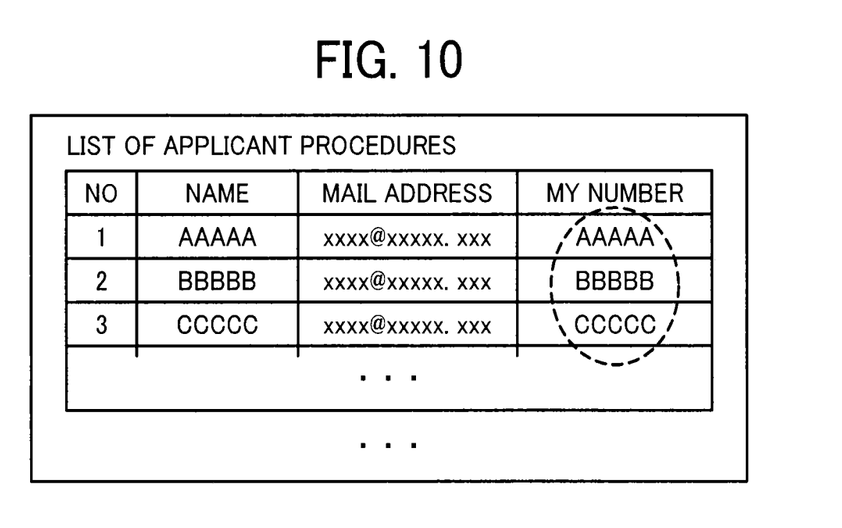
FIG. 10 illustrates an exemplary conversion result of the data to be printed.

FIG. 9 illustrates a diagram of exemplary data to be printed. For example, in FIG. 9 "name", "affiliation", "mail address", and "My Number" of the plurality of the users for each other which are displayed like a list are the data to be printed. FIG. 10 illustrates an exemplary conversion result of the data to be printed. In particular, FIG. 10 illustrates a diagram indicating a state where My Number is converted to a name in the processing of S806.

In the conversion result illustrated in FIG. 10, the data to be printed is set such that information in the "name" column is also displayed in the "My Number" column. As a result, the "My Number" is replaced or obscured by "name." Such information is then printed as a print result. As illustrated in FIG. 10, if the data is set into a condition, in which My Number is converted to other information based on the database shown in FIG. 7, My Number itself is not displayed. Therefore, the printed document does not include the My Number and the My Number cannot be stolen from the printed document.

Prior to printing the document, the information may be displayed (via a user interface) in association with My Number so that a user may confirm whether the My Number corresponds with the conversion information (which in this example would be the "name"). For example, in FIG. 10 the user may confirm whether the two names displayed, one in the "name" column and one in the "My Number" column, match or not.

Figure 11:
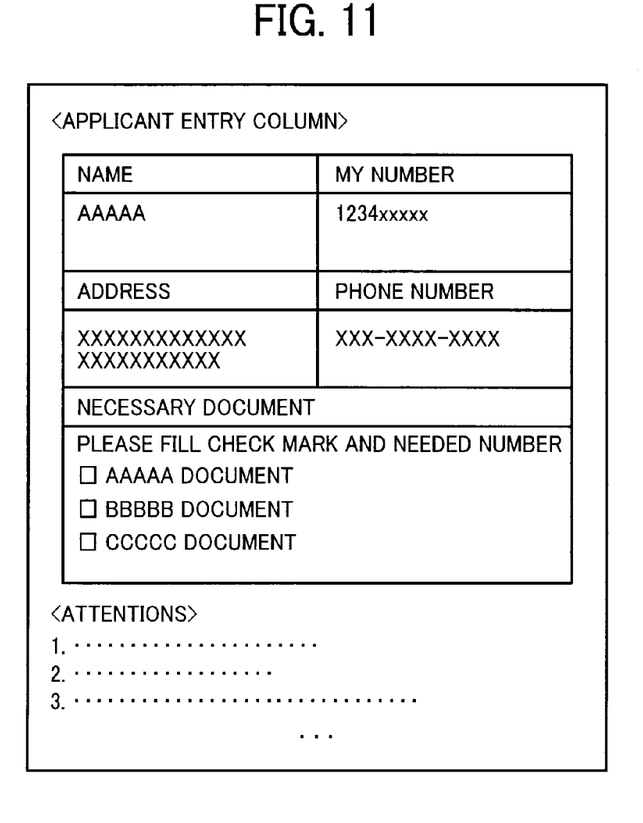
FIG. 11 illustrates exemplary data to be printed.
Figure 12:
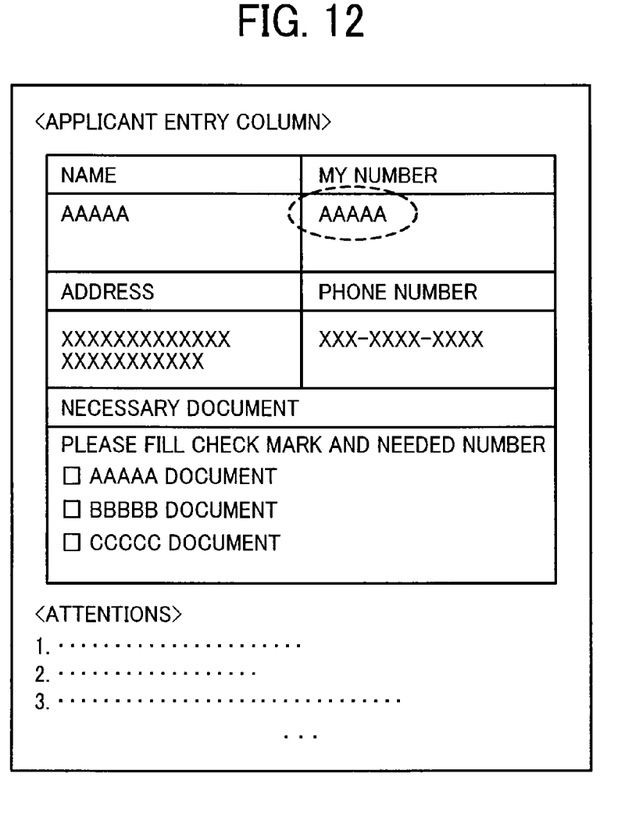
FIG. 12 illustrates an exemplary conversion result of the data to be printed.

FIG. 11 illustrates exemplary data to be printed. For example, in FIG. 11, the data to be printed includes personal information of a single user. FIG. 12 illustrates an exemplary conversion result of the data to be printed. In particular, FIG. 12 illustrates a state of the information of My Number, included in the data to be printed of FIG. 11, after conversion to the name, according to the processing of S806.

Returning to the processing of S806, when the information conversion processing unit 323 converts the data to be printed, the print data generating unit 314 generates print data based on the converted data (S807). Then, the print data outputting unit 315 instructs the network controlling unit 201 to transmit the print data (S808). After these processing steps, generating the print data and transmitting the print data, the process illustrated in FIG. 8 is finished.

Figure 13:
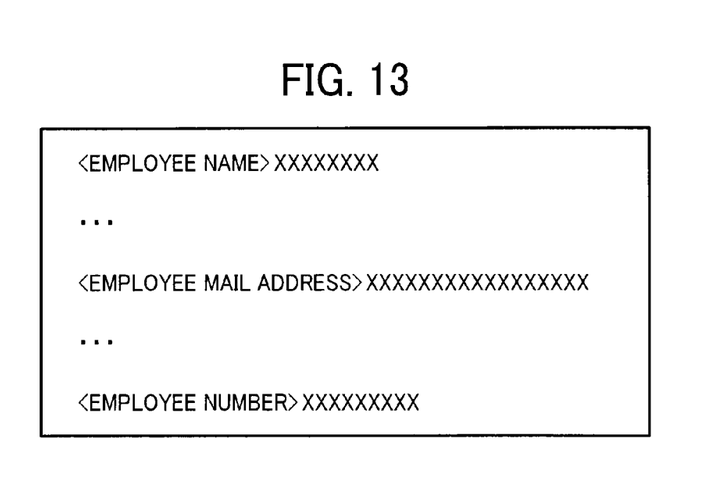
FIG. 13 illustrates exemplary tag data included in information of the data to be printed.

Next, further discussion is provided with respect to the processing S804. The conversion information obtaining unit 322 according to the present embodiment decides the item of the conversion information based on the tag information included in the data to be printed. FIG. 13 illustrates exemplary tag data included in information of the data to be printed. For example, in FIG. 13, the information of "employee name", "employee mail address", and "employee number" is included in the data to be printed.

Figure 14:
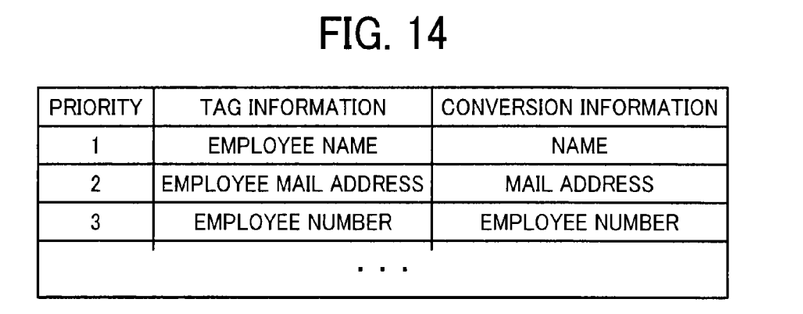
FIG. 14 illustrates an exemplary table including conversion information associated with priority information and the tag data.

FIG. 14 illustrates an exemplary table including conversion information associated with priority information and the tag data. The conversion information obtaining unit 322 stores the information, which includes a set priority in association with the tag information and the conversion information. The priority information may be predetermined, set via a user input, or determined according to pre-set processing rules.

In an exemplary implementation, the conversion information obtaining unit 322 uses the "conversion information," associated with the tag information, that is of the highest priority among the tag information extracted from the data to be printed. In other implementations, conversion information obtaining unit 322 may store alternative priority information associated with the tag information and the conversion information.

As described above, in the processing of generating the print data, the information to which the My Number is converted, is displayed as associated with My Number in the data to be printed. Thereby, as illustrated in FIG. 10 and FIG. 12, a user may determine whether the information converted accurately corresponds to the My Number.

As illustrated in FIG. 13 and FIG. 14, the conversion information obtaining unit 322 extracts the "conversion information" included in the data to be printed by analyzing the tag information. The conversion information obtaining unit 322 decides the conversion information according to the item extracted. Therefore as described above, it is possible to use the other item displayed associated with My Number in the data to be printed as the conversion information. It is possible to automatically decide the conversion information according to the data to be printed.

Figure 15:
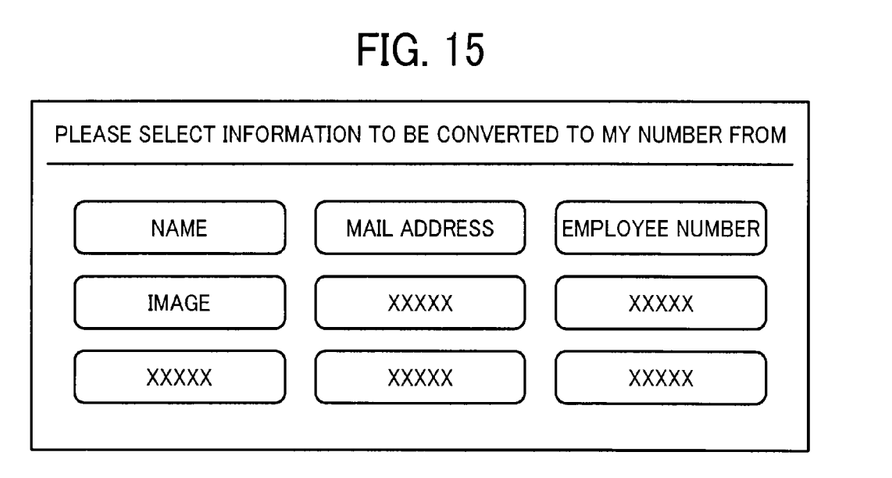
FIG. 15 illustrates an exemplary conversion information selection screen.

In some embodiments, the conversion information may be decided by manual operation or user input. In such cases, at S804, a conversion information selection screen as illustrated in FIG. 15 is displayed via on LCD 60 of the client terminal 2. The conversion information obtaining unit 322 decides the conversion information based on a selection result of a selection operation by the user.

Furthermore, when the conversion information obtaining unit 322 generates the conversion information selection screen illustrated in FIG. 15, the conversion information obtaining unit 322 may vary the displayed information choices according to the information corresponding to My Number included in the data to be printed. That is, conversion information obtaining unit 322 displays information choices to be selected by the user, and each the information choices displayed corresponds to information included in the data to be printed. The conversion information obtaining unit 322 does not display an information choice that corresponds to information that is not included in the data to be printed.

When the conversion information obtaining unit 322 changes the choices in the conversion information selection screen shown in FIG. 15, for example, the conversion information obtaining unit 322 may do so according to the tag information included in the data to be printed, shown in FIG. 13. Thus, so that the item extracted with analyzing the tag information only is displayed as the choices, the conversion information obtaining unit 322 preferably generates the conversion selection screen.

As described above in the processing of generating the print data according to the present embodiment, the My Number included in the data to be printed is extracted by the circuitry. The My Number is then converted to other information that is displayed in association with My Number in the data to be printed. Thus, a user may easily check whether the My Number corresponds to the other information without printing the My Number.

Furthermore, the My Number detecting unit 321 detects the area prescribed by the My Number detection condition illustrated in FIG. 6. However, in some situations, the My Number detecting unit 321 may determine the My Number based on character string information extracted by Optical Character Recognition (OCR).

In some embodiments, a My Number conversion function may be implemented by client terminal 2 while the function of the My Number conversion processing unit 312 is implemented by the MFP 1.

MFP 1 may generate bitmap data to which a print engine refers in order to execute image forming outputting based on the print job received from client terminal 2. When MFP1 executes an information processing and refers to the print job, such as by the My Number conversion processing unit 312 it is possible to achieve the processing of analyzing the print data in the print job and converting My Number.

Embodiments in accordance with the present disclosure may utilize circuitry, dedicated hardware or a mixture of dedicated hardware and and/or circuitry executing software stored in internal and/or external memory. For example, the present disclosure may be implemented as one or more networked processing apparatuses including circuitry that executes software in accordance with the present disclosure. Processing apparatuses in accordance with the present disclosure may comprise any suitably programmed apparatuses such as a general purpose computer, personal digital assistant, mobile telephone (such as a WAP or 3G-compliant phone), server, accessory device or other digital device including circuitry.

Aspects of the present disclosure may encompass computer software that is executed by circuitry, processing circuitry, or another programmable device. The computer software may be provided to the programmable device using any storage medium for storing processor readable code such as a floppy disk, hard disk, CD-ROM, magnetic tape device, solid state or other memory device.

Features in accordance with the present disclosure may be stored in a non-transitory computer readable medium. For example, a non-transitory computer readable medium may store computer executable instructions that, when executed by circuitry of an imaging apparatus, cause the circuitry to perform information processing in accordance with the present disclosure. That is, the computer executable instructions may cause an imaging to perform the processing discussed above with respect to FIG. 8.

Moreover, variations and modifications may be made without departing from the scope of the present disclosure.

What is claimed is:

1. An information processing apparatus connected to an image forming apparatus via a network, the information processing apparatus comprising:
   circuitry configured to
   detect an identification number from character strings in data to be printed on a medium;
   obtain, from association information that associates the identification number and character strings in items other than the identification number, conversion information that indicates a character string that is associated with the identification number and that is included in the data to be printed;
   generate modified data to be printed by converting all instances of the identification number in the data to be printed to be the character string indicated in the conversion information; and
   generate print data based on the modified data to be printed.

2. The information processing apparatus according to claim 1, wherein the circuitry is configured to:
   refer to priority information that sets a priority of a plurality of items included in the data to be printed;
   select a particular item, of the plurality of items, with a highest priority; and
   obtain information associated with the particular item and the identification number detected in the data to be printed.

3. The information processing apparatus according to claim 1, wherein the circuitry is configured to:
   select, in response to a user input, a particular item of a plurality of items included in the data to be printed; and
   obtain information associated with the particular item and the identification number detected in the data to be printed.

4. The information processing apparatus according to claim 3, wherein the circuitry is configured to:
   generate a selection screen for output to a user, the selection screen including a plurality of selection items, each selection item corresponding to a different one of the plurality of items; and
   output the selection screen.

5. The information processing apparatus according to claim 4, wherein the circuitry is further configured to:
   receive the user input of a selection that identifies one of the selection items; and
   select the item according to the received selection.

6. The information processing apparatus according to claim 1, wherein the circuitry is configured to detect the identification number included in the data to be printed by analyzing information located at a predetermined position in the data to be printed.

7. The information processing apparatus according to claim 6, wherein the circuitry is configured to detect the identification number when character string information of the information at the predetermined position matches a predetermined condition.

8. The information processing apparatus according to claim 1, wherein the circuitry generates the modified data to be printed by replacing the identification number included in the data to be printed with other information according to the conversion information.

9. The information processing apparatus of claim 1, further comprising:
   a memory storing a conversion information database that includes the association information that associates the identification number to the character strings in the items, wherein
   the circuitry obtains the conversion information from the association information stored by the conversion information database.

10. An information processing method, comprising:
    detecting, by circuitry of the information processing apparatus, an identification number from character strings in data to be printed on a medium;
    obtaining, from association information that associates the identification number and character strings in items other than the identification number, conversion information that indicates a character string that is associated with the identification number and that is included in the data to be printed;

generating, by the circuitry, modified data to be printed by converting all instances of the identification number in the data to be printed to be the character string indicated in the conversion information; and generating print data based on the modified data to be printed.

11. The information processing method according to claim 10, further comprising:

referring to priority information that sets a priority of a plurality of items included in the data to be printed;

selecting a particular item, of the plurality of items, with a highest priority; and obtaining information associated with the particular item and the identification number detected in the data to be printed.

12. The information processing method according to claim 10, further comprising:

selecting, in response to a user input, a particular item of a plurality of items included in the data to be printed; and obtaining information associated with the particular item and the identification number detected in the data to be printed.

13. The information processing method according to claim 12, further comprising:

generating a selection screen for output to a user, the selection screen including a plurality of selection items, each selection item corresponding to a different one of the plurality of items; and outputting the selection screen.

14. The information processing method according to claim 10, wherein the detecting the identification number includes analyzing information located at a predetermined position in the data to be printed.

15. The information processing apparatus method to claim 14, wherein the detecting the identification number includes:

detecting the identification number when character string information of the information at the predetermined position matches a predetermined condition.

16. A non-transitory computer readable medium storing computer executable instructions that, when executed by circuitry of an information processing apparatus, causes the information processing apparatus to:

detect an identification number from character strings in data to be printed on a medium;

obtain, from association information that associates the identification number and character strings in items other than the identification number, conversion information that indicates a character string that is associated with the identification number and that is included in the data to be printed;

generate modified data to be printed by converting all instances of the identification number in the data to be printed to be the character string indicated in the conversion information; and generate print data based on the modified data to be printed.

17. The non-transitory computer readable medium according to claim 16, wherein the information processing apparatus is further caused to:

refer to priority information that sets a priority of a plurality of items included in the data to be printed;

select a particular item, of the plurality of items, with a highest priority; and obtain information associated with the particular item and the identification number detected in the data to be printed.

18. The non-transitory computer readable medium according to claim 16, wherein the information processing apparatus is further caused to:

select, in response to a user input, a particular item of a plurality of items included in the data to be printed; and obtain information associated with the particular item and the identification number detected in the data to be printed.

19. The non-transitory computer readable medium according to claim 18, wherein the information processing apparatus is further caused to:

generate a selection screen for output to a user, the selection screen including a plurality of selection items, each selection item corresponding to a different one of the plurality of items; and output the selection screen.

20. The non-transitory computer readable medium according to claim 16, wherein the information processing apparatus is further caused to analyze information located at a predetermined position in the data to be printed to detect the identification number.

* * * * *